Figure 1:
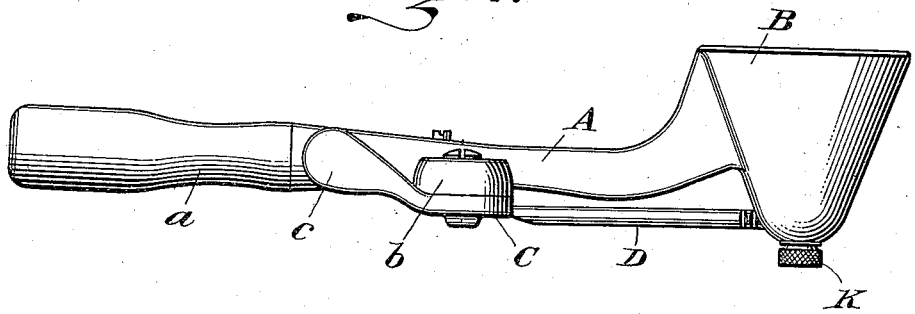

E. WALKER.
ICE CREAM DISHER.
APPLICATION FILED JULY 19, 1910.

1,162,116.

Patented Nov. 30, 1915.
2 SHEETS—SHEET 1.

WITNESSES
Robert Head
J. F. Mothershead

INVENTOR
Edwin Walker
BY Griffins Bernhard
ATTORNEYS

E. WALKER.
ICE CREAM DISHER.
APPLICATION FILED JULY 19, 1910.

1,162,116.

Patented Nov. 30, 1915.
2 SHEETS—SHEET 2.

WITNESSES
Robert Head
J. F. Mothershead

INVENTOR
Edwin Walker
BY Griffins Bernhard
ATTORNEYS

COLUMBIA PLANOGRAPH CO., WASHINGTON, D. C.

UNITED STATES PATENT OFFICE.

EDWIN WALKER, OF ERIE, PENNSYLVANIA.

ICE-CREAM DISHER.

1,162,116.  Specification of Letters Patent.  Patented Nov. 30, 1915.

Application filed July 19, 1910. Serial No. 572,682.

*To all whom it may concern:*

Be it known that I, EDWIN WALKER, a citizen of the United States, residing in Erie, county of Erie, and State of Pennsylvania, have invented a certain new and useful Ice-Cream Disher, of which the following is a specification.

This invention is an ice cream disher embodying a novel construction of the rotatable scraper whereby it may be disconnected readily from the bowl or cup without dismantling the finger operating mechanism, the latter being provided for the purpose of imparting rotary motion to said scraper when the latter occupies an operative position within said cup or bowl.

For sanitary reasons, the scraper is removable from the cup or bowl, but when the scraper is operatively fitted to, and rotated within, the bowl, it is necessary to provide means for retaining the scraper in its operative position, said retaining means being unaffected by the rotation of the scraper, whereby the scraper will not become displaced when the device is in use.

Two leading features of the invention consist, first, of a hollow member, preferably a sleeve, rotatably fitted in the cup and adapted to support a scraper therein, and, second, means coöperating with the scraper and the sleeve for retaining the scraper in operative engagement with said sleeve when the device is in use.

A salient feature of this invention, in a preferred embodiment thereof, consists of a sleeve and a nut connected operatively to each other for rotative movement, combined with a scraper having a stem which passes through the sleeve and is threaded into the nut, whereby the scraper is connected detachably to the nut and the sleeve.

In practical embodiments of the invention shown in the accompanying drawings, the sleeve is connected to a cup or bowl in different ways, whereby the connected sleeve and nut may remain attached to the cup or bowl when the scraper and its stem are withdrawn from said cup, but in a preferred form, the sleeve and nut are withdrawn from the cup, whereby the scraper and stem may be displaced in one direction through the larger open end of the cup, while the connected sleeve and nut may be withdrawn from the cup, by moving the same in an opposite direction to the direction of movement of the scraper during the act of removing it. Furthermore, the gear by which the stem and scraper are rotated may be attached fixedly to said stem for the purpose of removing the gear when the scraper is removed, but it is preferred to employ a sleeve of such length that said sleeve will find a bearing at two points within the cup, and to attach the gear to said sleeve, whereby the gear, sleeve and nut are connected for simultaneous rotation.

According to this invention, the sleeve carries or supports the nut in such manner that the nut will not have frictional engagement with a stationary part, such as the cup, whereby the rotary motion of the nut with the stem, scraper, gear and sleeve will not result in the nut working loose upon the stem, nor allow the stem to become disconnected from the nut and the scraper to be detached from the implement during the use thereof, thus securing a most important advantage in a construction of disher of that type wherein the scraper stem is held in operative position by engagement with a member capable of rotation with the scraper.

Other functions and advantages of my disher will appear in the course of the detailed description hereinafter given.

In the accompanying drawings I have illustrated different practical embodiments of the invention, but the constructions shown therein are to be understood as illustrative, only, and not as defining the limits of the invention.

Figure 2:
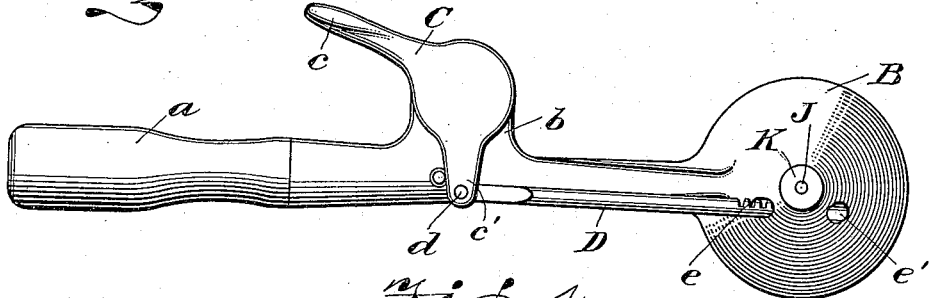
Figures 3, 4, 5:
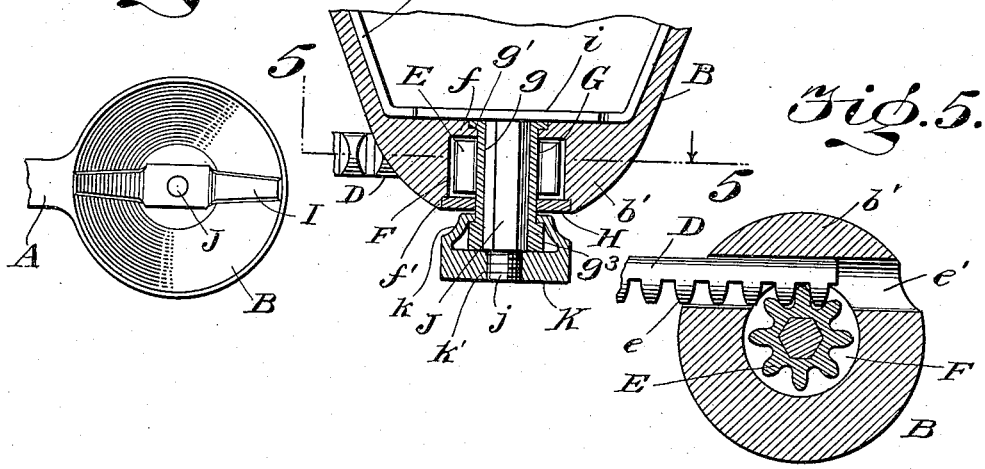
Figure 6:
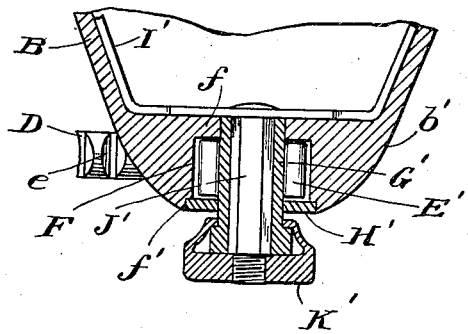
Figure 7:
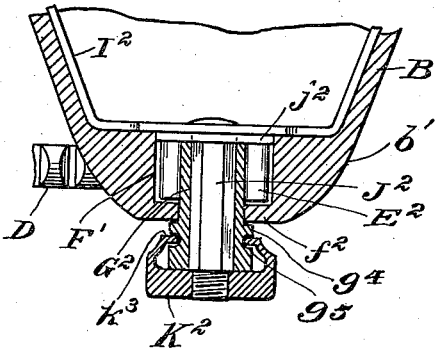
Figure 8:
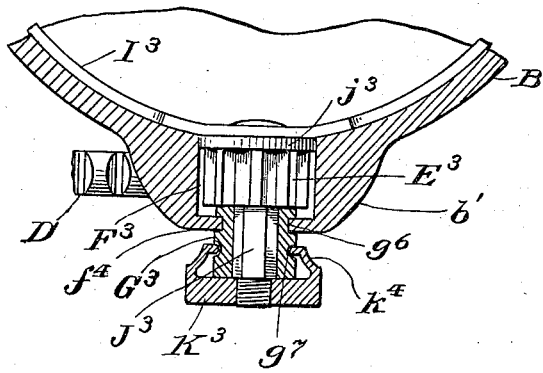
Figure 9:
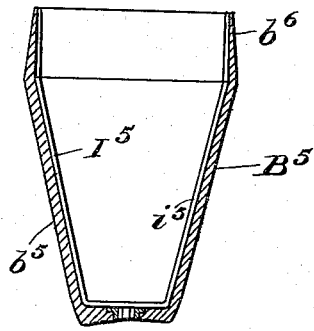

Figure 1 is a view in side elevation of an ice cream disher embodying this invention. Fig. 2 is a plan view looking at the closed end of the cup or bowl. Fig. 3 is a plan view of the bowl looking at the open end thereof and showing a rotatable scraper therein. Fig. 4 is an enlarged vertical section, partly in elevation, through the closed part of the cup illustrating one means for operating the scraper and retaining said scraper detachably in position within the cup. Fig. 5 is a detail section on the line 5—5 of Fig. 4 illustrating means for imparting rotary motion to a gear whereby the scraper is rotated within the cup or bowl. Figs. 6, 7, and 8 are enlarged detail sections somewhat similar to Fig. 4 illustrating other embodiments of means whereby the scraper may be rotated within the bowl and retained in operative position therein while allowing for easy removal of the scraper for cleaning purposes. Fig. 9 illustrates a vertical section through a preferred form of bowl and a scraper coöperating therewith.

In Figs. 1 and 2 of the drawings there is shown an ice cream disher which in general respects is similar to those disclosed in certain prior applications heretofore filed by me, either as sole or joint inventor. On one end of a frame, A, is a bowl or cup, B, said frame having a suitable handle, a. The frame is shown as having an upstanding lug, b, on which is pivoted a finger lever, C, said lever having a finger or thumb piece, c, and an arm, c′. To this arm is connected a scraper operating member, D, by means of pivotal pin, d, said member, D, being shown as a rod having a series of gear teeth, e, forming a rack adapted to mesh with a gear, E, by which the scraper is rotated.

As shown more clearly in Figs. 4, 6, 7, and 8 of the drawings, cup, B, is closed at one end, as at b′, the other end of the cup being open. In the closed end, b′, of the cup is a chamber, F, the axis of which is in line with the longitudinal axis of the cup. Chamber, F, is partially closed at one end by means of a flange, f, the other end of said chamber being open and provided with a shoulder f″.

In the construction shown in Figs. 4, 6, and 7 of the drawings I employ a sleeve, G, which extends practically through chamber, F. Said sleeve, G, is provided with an opening, g, angular or polygonal in cross section. In the construction represented in Fig. 4 sleeve, G, passes through a central opening which is provided in flange, f, of the cup, and at its inner end said sleeve has a shoulder, g′, which is upset so as to engage with the flange, f, whereby sleeve, G, is retained within the closed part of the cup by the coöperation of flanges, f, g′. At the same time sleeve, G, is free to rotate in the cup for the purpose of imparting motion to the scraper, as will presently appear.

Fitted loosely around sleeve, G, is a plate or washer, H, which is seated in the recess, f″, of the cup, whereby the plate or washer closes the outer end of chamber, F, and forms one of the two journals for sleeve, G. The disk or washer, H, is fitted loosely and externally on the sleeve before the latter is introduced into the closed end of the cup, and after such introduction, the end of the sleeve is upset or flanged, as at g′, for the purpose of retaining the sleeve within the cup while permitting it to rotate therein. It will be noted that the inner end of the sleeve is journaled on the flange, f, of the cup, whereas the outer part of the sleeve is journaled in a bearing formed by the plate or washer, H, whereby the sleeve is supported by a plurality of journals in the closed part of the cup.

Gear, E, is secured rigidly to sleeve, G, between flange, g′, and washer, H. Said gear is positioned within chamber, F, of the cup, whereby it is concealed from view and protected from the accession of dust and from the material which is dished out by the operation of the implement. The gear is made fast with the sleeve in any desired way for the purpose of rotating therewith. That part of the sleeve to which the gear is applied may be polygonal or square in cross section, and the gear may have a square opening whereby the gear is adapted to rotate with the sleeve.

In addition to chamber, F, the closed end of the cup is provided with a passage or opening, e′, the axis of which is at right angles to the axis of chamber, F, said passage or opening, e′, extending through opposite faces of the cup and intersecting with the chamber, see Fig. 5. Rack, e, of the operating chamber, D, is fitted loosely in the passage, e′, for reciprocating movement therein, whereby the teeth, e, of said rack are adapted to mesh with the teeth of gear, E, for the purpose of rotating the gear when member, D, is operated by applying pressure to the finger or thumb piece, c, of lever, C, in a manner well understood by those skilled in the art.

I designates a scraper, cleaner or similar element positioned within the bowl for the purpose of removing from the interior surfaces of said bowl the material which is dished out by the operation of the implement. The scraper, or equivalent member, is shaped to conform substantially to the inside contour of the bowl or cup, and said scraper is shown as having a cross piece, i, the latter fitting snugly to the inner closed end of the cup.

J designates a stem, one end of which is fastened rigidly in any suitable way to cross piece, i, of the scraper, the other end of said stem being reduced and screw threaded so as to form a tenon, j. Intermediate the threaded tenon and the cross piece, i, the scraper stem, J, is angular or polygonal in cross section so that the stem conforms to the passage, g, of the sleeve, whereby the stem may be slipped into the sleeve and coupled thereto for rotation with said sleeve when the latter is actuated by the rack and gear mechanism heretofore described. It is evident that the scraper may be introduced into the cup through the open end thereof, and that said scraper may be withdrawn from the cup through said opening. During the insertion or removal of the scraper, stem, J, remains attached thereto, and when said scraper is inserted or withdrawn the stem moves lengthwise with respect to sleeve, G.

An important feature of the invention consists of means for retaining the scraper in operative engagement with the sleeve when the parts are assembled for service, and in the embodiment of the invention represented in Fig. 4, the scraper is retained in position by a member herein shown as a nut, K. The nut is provided with flanges, $k$, which are swiveled on sleeve, G, for the purpose of retaining the nut in operative position on the sleeve, and of permitting the nut to have rotative movement upon said sleeve while the sleeve remains in a stationary position. The nut is shown as having a central internally threaded aperture, $k'$, adapted for the reception of the threaded tenon, $j$, on stem, J, whereby the nut may be screwed upon the threaded part of the stem. As shown, the flanges, $k$, of the nut are turned below the shoulder, $g^3$, produced on the outer end portion of the sleeve, G, said shouldered part of the sleeve extending beyond washer or plate, H.

From the foregoing description it is apparent that scraper, I, may be removed by rotating nut, K, on sleeve, G, in a direction to unscrew the nut from threaded tenon, $j$, whereby the stem and the scraper will be moved endwise until the nut is disconnected from the stem, after which the scraper may be lifted out of the cup, or the cup may be inverted so as to drop the scraper and the stem connected thereto out of the cup. The parts are thus disconnected for the purpose of exposing their surfaces whereby the cup and the scraper may be thoroughly cleaned and sterilized. To reassemble the parts it is only necessary to place the scraper within the cup in a manner for the stem to pass through the sleeve and its tenon, $j$, to enter the threaded aperture of the nut, at which time the nut is rotated in a direction to screw the tenon into said nut, whereupon the scraper will be drawn into position within the cup until the cross member, $i$, of the scraper engages with the inner flanged end, $g'$, of the sleeve. The scraper is thus connected operatively with the sleeve and the nut.

The implement may be used in the well known manner for the purpose of filling the cup with cream, water ice, or any other substance, and when it is desired to discharge the molded cream, the cup is inverted and lever, C, is operated, whereby movement is imparted to member, D, and gear, E, is rotated for the purpose of rotating the scraper within the cup, thus releasing the cream or other material from said cup, and permitting said material to be readily discharged.

It is desired to call attention to the fact that the nut rotates with the sleeve and the stem, J, when the member, D, imparts rotary motion to the scraper, but said nut, K, is supported by sleeve, G, in a manner to preclude the nut from having much frictional engagement with washer or plate, H, and the cup. It is evident that any frictional engagement between a rotating nut and a stationary surface will have a tendency to displace or unscrew the nut upon the threaded stem, but in my invention the nut is carried or supported wholly by the sleeve, and in a manner to preclude frictional contact of said nut with the washer or the cup, thus overcoming any tendency of the nut to work loose on the stem and permit the scraper to become disconnected from the cup.

In the embodiment shown in Fig. 4, I have shown the gear E as formed integral with the stem $g$, although, manifestly, it may, if desired, be fixedly secured thereto or detachably secured against rotation thereon.

The construction shown in Fig. 6 is the preferred embodiment of the invention for the reason that the sleeve and the nut connected thereto are removable from the cup independently of the scraper, i. e., the sleeve and nut may be withdrawn in one direction and the scraper with the stem attached thereto withdrawn in an opposite direction. The sleeve, G', is provided with the square or polygonal passage adapted to receive a square or polygonal stem, J', of scraper, I'. The inner end of sleeve, G', is not flanged or shouldered, but it is fitted rotatably in bearing formed by flange, $f$, the outer part of the sleeve having a journal formed by plate or washer, H', which is fitted removably in the shoulder, $f'$, of the cup. Gear, E', is attached externally to sleeve, G', at a point intermediate its ends, said gear being adapted to lie within chamber, F, and to engage with rack, $e$, on operating member, D, as heretofore described.

Nut, K', is slipped on or swiveled to the outer part of sleeve, G', so as to remain connected therewith and to be supported thereby. The construction and operation of the device shown in Fig. 6 is quite similar to that heretofore described in connection with Fig. 4, except than when the nut is unscrewed from the threaded tenon of stem, J', said stem and the scraper may be withdrawn from the cup by moving the parts in one direction while the sleeve, the nut attached thereto, the gear fixed thereon, and the plate or washer, H', may be withdrawn from the chamber, F, of said cup by moving the sleeve in an opposite direction to that in which the scraper is withdrawn. The sleeve and the gear may thus be detached and exposed for cleaning and sterilizing them in the same manner that scraper, I', and stem, J', may be cleaned and sterilized. In reassembling the parts for use, the sleeve is adjusted to the closed part of the cup for the inner end of the sleeve to find a bearing in flange, $f$, while plate or disk, H', is seated in the shouldered part, $f'$.

The gear occupies chamber, F, and meshes with the rack or member, D. The scraper may be inserted into the cup for its stem to pass through the sleeve, and by rotating nut, K', the stem is connected with the sleeve for the purpose of holding the scraper in operative position, said scraper being drawn tightly against the inner end of the sleeve, whereby the scraper and stem will rotate with the sleeve when gear, E', is operated by member, D.

The construction illustrated in Fig. 7 differs somewhat from the construction of Figs. 4 and 6. Chamber, F', of the cup is not provided at its inner end with a shoulder, such as $f$, but at the outer end of the chamber the cup is formed with an inwardly extending flange, $f^2$. Scraper, $I^2$, is provided with a square or polygonal stem, $J^2$, and with a washer, $j^2$, the latter fitting snugly to the wall of chamber, F', so as to form a bearing for the inner end of sleeve, $G^2$. Gear, $E^2$, is fixed externally on sleeve, $G^2$, for the purpose of rotating the sleeve and the scraper when member, D, is operated. The sleeve is provided with a shoulder, $g^4$, and a groove, $g^5$. The shoulder is adapted for coöperation with flange, $f^2$, at the outer end of chamber, F'. Nut, $K^2$, is provided with a flange, $k^3$, which is turned into the groove, $g^5$, of the sleeve, whereby the nut is rotatably connected to the outer grooved and shouldered end of the sleeve. According to this embodiment of the invention, the gear $E^2$ may be either formed integral with the sleeve $G^2$, may be fixedly secured thereon, or removably secured thereto against rotation, but I have shown, in said figure, the gear as fixedly secured to the sleeve. According to this construction, the scraper may be removed at will by simply manipulating the nut $K^2$, while the sleeve and gear are maintained, at all times, within the cup. However, if the gear were detachably secured against rotation, the unscrewing of the nut $K^2$ would allow of the withdrawal of the scraper from the cup as well as the withdrawal of the sleeve $G^2$ from the gear, thereby allowing the gear to be dropped out of the cup.

In Fig. 8 of the drawings scraper, $I^3$, is provided with a flange, $j^3$, similar to the flange, $j^2$, of Fig. 7. In this construction, however, I employ a comparatively short sleeve, $G^3$, the inner part of which does not extend across chamber, $F^3$, of the cup. Sleeve, $G^3$, is provided with an annular groove, $g^6$, adapted to receive a flange, $f^4$, of the cup, whereby the sleeve is rotatably connected to the outer part of said cup. In addition to groove, $g^6$, the sleeve is provided with an annular groove, $g^7$, with which engages the inturned edge, $k^4$, of nut $K^3$. It will be noted that the sleeve is rotatably connected to the cup, and that the nut is rotatably connected to the sleeve. Said sleeve, $G^3$, is provided with a square or polygonal opening to receive a square or polygonal part of stem, $J^3$, the latter being rigidly secured in a suitable way to scraper, $I^3$. In this form of the invention gear, $E^3$, is not attached to sleeve, $G^3$, but on the contrary, said gear is fastened rigidly in any suitable way to stem, $J^3$, at a point between washer, $j^3$, and the polygonal part of the stem. When the scraper, $I^3$, is withdrawn by unscrewing nut, $K^3$, from the stem, said stem, $J^3$, and gear, $E^3$, remain attached to the scraper and are withdrawn therewith from the cup. After cleaning the scraper, the gear and the stem, the parts may be replaced by inserting the stem into the sleeve, and rotating the nut so as to draw the gear against the end of the sleeve. The washer, $j^3$, of the scraper forms a journal for supporting said scraper within chamber, $F^3$, of the cup, the stem, $J^3$, being secured in sleeve, $G^3$, which is journaled in the outer part of the cup, thus insuring free rotation of all the parts when member, D, is operated to rotate the scraper by acting directly upon gear, $E^3$.

Fig. 9 of the drawings illustrates a form of cup which I employ under certain conditions, such as when dishing ice cream to be deposited in edible cones, as now practised in the art. As shown, the cup, $B^5$, consists of a substantially conical portion, $b^5$, and a substantially cylindrical portion, $b^6$. The cylindrical part, $b^6$, is at the open end of the cup, and said cylindrical part forms an extension or continuation of the walls constituting the conical part, $b^5$, of said cup. The scraper, $I^5$, is provided with members or blades, $i^5$, which conform to the interior contour of the conical and cylindrical parts of the cup so that the scraper will operate effectively upon the material adhering to the walls of the cup for the purpose of releasing said material and permitting the same to be readily discharged. With scraper, $I^5$, is associated a stem adapted to be supported and operated by either of the devices hereinbefore described, whereby the scraper is rotatably connected to the operating mechanism, and it may be disconnected by unscrewing the nut from the stem in an obvious manner. The employment of a cup, such as $B^5$, molds ice cream or other edible product so as to produce a cylindrical base portion and a conical body portion, which cylindrical base portion is adapted to enter the enlarged open end of an ice cream cone, thus exposing the conical part of the cream for ready access in eating it.

Having thus fully described the invention, what I claim as new, and desire to secure by Letters Patent is:—

1. In a device of the class described, a cup, a scraper, means for imparting movement to said scraper, a sleeve journaled in the cup for rotation therein, and a retaining member operatively connected with the scraper, said retaining member being mounted upon the sleeve, whereby the retaining member is precluded from working loose by contact with said cup or with another relatively stationary surface.

2. In a disher, the combination with a cup, a scraper operating therein and removable therefrom, and means for imparting rotative movement to said scraper, of a scraper retaining member rotatable with the scraper and independent of the scraper operating means in the carrying out of its function, and means for supporting said scraper-retaining member in a position free from engagement with the cup, said supporting means being independent of the scraper rotating means.

3. In a disher, the combination with a cup, a scraper provided with a stem, and means acting through the stem for imparting rotative movement to the scraper, of a retaining member coöperating with the stem for precluding accidental displacement of the scraper from the bowl, and means separate from the stem for supporting the retaining member in an operative position free from contact with said cup.

4. In a disher, the combination with a cup, a scraper provided with a stem, and means for imparting rotative movement to said scraper, of a retaining member rotative with the stem, and means separate from the stem for holding the retaining member normally in operative position upon the cup, whereby the scraper and stem may be disconnected at will from the cup whereas the holding means supports the retaining member in a position to receive the stem upon the insertion of the scraper.

5. In a device of the class described, a cup, a hollow member rotatably fitted in said cup, a scraper, a stem angular in cross section and fitted in said hollow member for rotation therewith, a retaining member engaging said stem, and means for imparting motion to the stem and scraper.

6. In a device of the class described, a cup, a member having a stem receiving opening polygonal in cross section, said member being rotatable with respect to the cup, a scraper, a polygonal stem fitting the polygonal opening of said member and rotatable therewith, means for retaining the stem and member in operative engagement, and means for imparting movement to said stem and scraper, said retaining means being independent of the scraper operating means in the carrying out of its function.

7. In a device of the class described, a cup, a member having a stem receiving opening polygonal in cross section, said member being rotatable with respect to the cup, a scraper, a polygonal stem fitting the polygonal opening of said member, said stem being attached to the scraper and withdrawable from the member, means for retaining the stem and the member in operative engagement during rotation of the scraper, and means for rotating the scraper, said retaining means being independent of the scraper operating means in the carrying out of its function.

8. In a disher, the combination of a cup provided in the base thereof with a separate gear-incasing chamber, a scraper provided with a stem, a gear positioned within said chamber and fitted to said stem for rotation therewith, said scraper and stem being withdrawable at will from the cup and the gear, respectively, while the gear remains in position within said chamber of the cup, means for imparting rotative movement to the gear, and a retaining member coöperating with the stem.

9. In a device of the class described, the combination of a handle member, a cup permanently secured thereto, a hollow member rotatably supported in the cup, a scraper detachably mounted in said cup, and adapted to be withdrawn therefrom to allow of the proper cleansing of the cup and scraper, a stem on the scraper, which stem is fitted to said hollow member for rotation therewith, and is adapted to be disconnected therefrom, means for retaining the stem in operative engagement with said hollow member during the rotation of the scraper, a gear for rotating the stem, and a rack for imparting rotary motion to the gear.

10. In a device of the class described, the combination of a cup, a handle member permanently secured thereto, a scraper detachably mounted within said cup, a sleeve rotatable within the cup, a stem attached to the scraper, said stem fitting in said sleeve for rotation therewith, means for retaining the stem in operative engagement with the sleeve, a gear coöperating with the stem, and a rack for imparting rotary motion to the gear.

11. In a device of the class described, a cup, a sleeve rotatable in the cup, a scraper, a stem attached to the scraper, said stem fitting in said sleeve for rotation therewith, means coöperating with the stem and the sleeve for retaining the scraper in position, and operable to release the stem from the sleeve prior to withdrawal of the scraper, and means for rotating the scraper.

12. In a device of the class described, a cup, a sleeve rotatable in said cup, a scraper, a stem connected to the scraper and fitting the sleeve for rotation therewith, a nut coöperating with the sleeve and the stem, and means for rotating the scraper.

13. In a device of the class described, a cup, a sleeve rotatable in said cup, a scraper, a stem connected to the scraper and fitting the sleeve for rotation therewith, a nut screwed on the stem and held by the sleeve out of engagement with the cup, and means for rotating the scraper.

14. In a device of the class described, the combination of a cup, a sleeve rotatable in said cup, a scraper, a stem on the scraper, which stem extends through the sleeve in the cup, means for rotating the sleeve and the stem for the purpose of transmitting rotary motion to the scraper, and means mounted on the sleeve for detachably securing the stem and scraper in operative position within the cup, said securing means being independent of the scraper operating means in the carrying out of its function.

15. In a device of the class described, a cup, a sleeve rotatable therein, a scraper, means for operatively connecting the scraper to the sleeve, said scraper being removable from the cup without affecting the relation of the sleeve to the cup, and means for rotating the scraper.

16. In a device of the class described, a cup, a sleeve rotatable therein, a scraper, a stem attached to the scraper, means for retaining the stem in operative relation to the sleeve, and means for rotating the scraper, said stem being removable from the sleeve and withdrawable with the scraper from the cup without disturbing the relation of the sleeve to said cup.

17. In a device of the class described, the combination with a cup, a scraper detachably positioned within said cup and having a stem, a sleeve adapted to receive the stem of the scraper, a nut threaded on said stem for locking the stem against longitudinal movement relative to the sleeve, and means coöperating with the stem of the scraper for rotating said scraper, said sleeve being mounted upon the cup so as to be secured thereto irrespective of the presence of the scraper.

18. In a device of the class described, a cup, a sleeve rotatable therein, a nut connected to the sleeve for rotation relative thereto and also adapted for rotation therewith, a scraper, a stem attached to the scraper and held in the sleeve by the nut, and means for rotating the scraper.

19. In a device of the class described, a cup, a sleeve rotatable therein, a nut having a swiveled connection with the sleeve and retained thereby out of engagement with the cup, a scraper, a stem attached to the scraper and retained within the sleeve by said nut, and means for imparting rotation to the stem and scraper.

20. In a device of the class described, the combination with a cup having a handle member permanently secured thereto, of a sleeve rotatably supported within the cup, a scraper detachably mounted within said cup, a stem attached to the scraper and fitted in the sleeve, and means for retaining the stem in operative engagement with said sleeve.

21. In a device of the class described, the combination with a cup, a sleeve rotatably supported within the cup, a scraper detachably mounted within the cup and adapted to be withdrawn therefrom for the purpose of separately cleansing the cup and scraper, a stem attached to the scraper and fitted in the sleeve, means mounted on the sleeve for maintaining the stem in operative engagement with the sleeve for normally precluding the withdrawal of the scraper from the cup, a gear coöperating with a stem and means for rotating the gear, said sleeve being adapted at all times to maintain the retaining member in its operative position.

22. In a device of the class described, the combination of a cup, a scraper detachably positioned within said cup, a polygonal stem secured to said scraper, a sleeve rotatably secured to the cup and adapted to receive the polygonal stem of the scraper, a nut screwed on said stem for maintaining the stem in engagement with the sleeve for the purpose of normally retaining the scraper within the cup, means for rotating the scraper, and means whereby the sleeve is maintained in operative position relative to the cup irrespective of the presence of the scraper and its stem.

In testimony whereof I have signed my name to this specification in the presence of two subscribing witnesses.

EDWIN WALKER.

Witnesses:
H. G. BERNHARD,
J. F. MOTHERSHEAD.

Copies of this patent may be obtained for five cents each, by addressing the "Commissioner of Patents, Washington, D. C."